US012637137B2

(12) United States Patent     (10) Patent No.:   US 12,637,137 B2

Ikeya et al.     (45) Date of Patent:     May 26, 2026

---

(54) STEERING CONTROL DEVICE AND STEERING CONTROL METHOD

(71) Applicants: JTEKT CORPORATION, Kariya (JP); TOYOTA JIDOSHA KABUSHIKI KAISHA, Toyota (JP); DENSO CORPORATION, Kariya-city (JP)

(72) Inventors: Mika Ikeya, Okazaki (JP); Kenichi Abe, Okazaki (JP); Yuuta Kajisawa, Okazaki (JP); Kazuma Hasegawa, Anjo (JP); Kaishi Monobe, Toyota (JP); Takashi Koudai, Okazaki (JP); Masaharu Yamashita, Toyota (JP); Yosuke Yamashita, Nagoya (JP); Kazuaki Iida, Gotenba (JP); Shintaro Takayama, Toyota (JP); Nobuyori Nakajima, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 27 days.

(21) Appl. No.: 18/764,938

(22) Filed: Jul. 5, 2024

(65) Prior Publication Data

US 2025/0010910 A1     Jan. 9, 2025

(30) Foreign Application Priority Data

Jul. 7, 2023    (JP) ................................. 2023-112489

(51) Int. Cl.
   B62D 5/04       (2006.01)
   B62D 5/00       (2006.01)
   B62D 6/00       (2006.01)

(52) U.S. Cl.
CPC ........... B62D 5/0481 (2013.01); B62D 5/001 (2013.01); B62D 5/046 (2013.01); B62D 6/008 (2013.01)

(58) Field of Classification Search
None
See application file for complete search history.

(56) References Cited

U.S. PATENT DOCUMENTS 7,481,294 B2 *   1/2009   Fujita ................. B62D 15/0245
                                             701/41
9,381,939 B2 *   7/2016   Chai .................... B62D 15/021
                 (Continued)

FOREIGN PATENT DOCUMENTS

CN       119262053 A   *   1/2025   ............. B62D 5/046
EP         4166422 A2   *   4/2023   ........... B62D 5/0457
                 (Continued)

OTHER PUBLICATIONS

Nov. 11, 2024 Extended Search Report issued in European Patent Application No. 24186557.5.

*Primary Examiner* — Kevin R Steckbauer

(74) *Attorney, Agent, or Firm* — Oliff PLC

(57)             ABSTRACT

A steering control device is applied to a vehicle steering system for steering traveling of a vehicle. The steering control device includes a rudder angle control unit that executes a control in which a rudder angle variable obtained about the steering is referred to. The rudder angle control unit executes a control information setting process of setting control information that is a value indicating straight movement of the vehicle and that is a reference of the rudder angle variable. In the control information setting process, the rudder angle control unit enables a control to steer the (Continued)

traveling of the vehicle, by completing setting of the control information after an electric power source of the vehicle steering system is turned on.

7 Claims, 6 Drawing Sheets

(56) References Cited

U.S. PATENT DOCUMENTS

| | | | | |
|---|---|---|---|---|
| 9,533,703 | B2 * | 1/2017 | Shimizu | F16D 41/064 |
| 9,764,760 | B2 * | 9/2017 | Kuramochi | B60W 10/184 |
| 10,583,856 | B2 * | 3/2020 | Miyashita | B62D 6/08 |
| 11,492,040 | B2 * | 11/2022 | Narasimhan | B62D 6/002 |
| 11,554,809 | B2 * | 1/2023 | Oka | B62D 15/0235 |
| 12,128,964 | B2 * | 10/2024 | Hasegawa | B62D 5/006 |
| 12,214,830 | B2 * | 2/2025 | Nagashima | B62D 5/0409 |
| 12,233,972 | B2 * | 2/2025 | Nagashima | B62D 5/006 |
| 12,252,191 | B2 * | 3/2025 | Sun | B62D 5/0484 |
| 2002/0033301 | A1 * | 3/2002 | Clephas | B62D 5/006 |
| | | | | 180/446 |
| 2006/0070794 | A1 * | 4/2006 | Fujita | B62D 15/0245 |
| | | | | 180/446 |
| 2015/0360715 | A1 * | 12/2015 | Shimizu | B62D 5/0484 |
| | | | | 701/43 |
| 2018/0099690 | A1 * | 4/2018 | Oya | B62D 5/0463 |
| 2018/0208235 | A1 * | 7/2018 | Miyashita | B62D 5/003 |
| 2020/0047805 | A1 * | 2/2020 | Oka | B62D 5/0463 |
| 2020/0114967 | A1 | 4/2020 | Nakajima et al. | |
| 2020/0207406 | A1 * | 7/2020 | Endoh | B62D 5/0481 |
| 2021/0009202 | A1 | 1/2021 | Suzuki | |
| 2021/0253159 | A1 | 8/2021 | Toyoda et al. | |
| 2021/0394824 | A1 | 12/2021 | Kakimoto et al. | |
| 2022/0289280 | A1 * | 9/2022 | Narasimhan | B62D 3/126 |
| 2023/0100164 | A1 * | 3/2023 | Sun | B62D 5/0484 |
| | | | | 701/41 |
| 2023/0117373 | A1 * | 4/2023 | Nagashima | H02P 5/74 |
| | | | | 701/41 |
| 2023/0119506 | A1 * | 4/2023 | Hasegawa | B62D 5/006 |
| | | | | 701/41 |
| 2023/0130839 | A1 * | 4/2023 | Nagashima | B62D 5/0463 |
| | | | | 701/41 |
| 2023/0365187 | A1 * | 11/2023 | Hasegawa | B62D 5/0484 |
| 2024/0010269 | A1 * | 1/2024 | Nagashima | B62D 15/025 |
| 2024/0400133 | A1 * | 12/2024 | Monobe | B62D 6/008 |
| 2025/0002077 | A1 * | 1/2025 | Ikeya | B62D 5/0481 |
| 2025/0010910 | A1 * | 1/2025 | Ikeya | B62D 5/001 |

FOREIGN PATENT DOCUMENTS

| | | | | | |
|---|---|---|---|---|---|
| EP | 4166423 | A2 * | 4/2023 | | B62D 5/0481 |
| EP | 4275994 | A1 * | 11/2023 | | B62D 15/021 |
| EP | 4488145 | A1 * | 1/2025 | | B62D 5/046 |
| JP | 2004291877 | A * | 10/2004 | | B62D 5/0484 |
| JP | 2015107739 | A * | 6/2015 | | |
| JP | 2016078567 | A * | 5/2016 | | |
| JP | 2020108327 | A * | 7/2020 | | |
| JP | 2021-195084 | A | 12/2021 | | |
| JP | 2023059527 | A * | 4/2023 | | B62D 5/0481 |
| JP | 2023059811 | A * | 4/2023 | | |
| JP | 2023166704 | A * | 11/2023 | | B62D 15/021 |
| JP | 2024171078 | A * | 12/2024 | | B62D 5/0481 |
| JP | 7697863 | B2 * | 6/2025 | | B62D 5/0481 |
| WO | WO-2021029407 | A1 * | 2/2021 | | B62D 5/0484 |

* cited by examiner

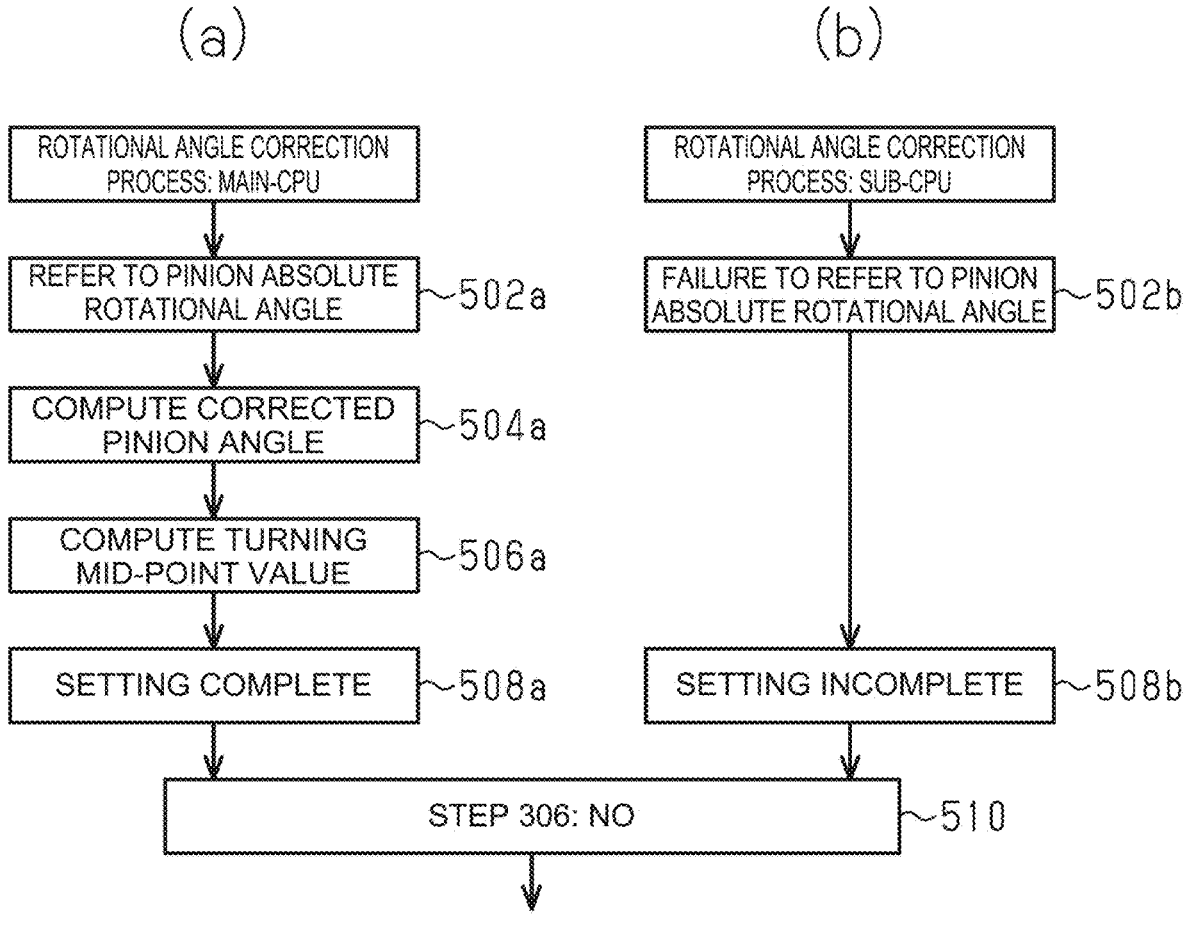

ROTATIONAL ANGLE CORRECTION
PROCESS: MAIN-CPU

REFER TO PINION ABSOLUTE
ROTATIONAL ANGLE ~502a

COMPUTE CORRECTED
PINION ANGLE ~504a

COMPUTE TURNING
MID-POINT VALUE ~506a

SETTING COMPLETE ~508a

ROTATIONAL ANGLE CORRECTION
PROCESS: SUB-CPU

FAILURE TO REFER TO PINION
ABSOLUTE ROTATIONAL ANGLE ~502b

SETTING INCOMPLETE ~508b

STEP 306: NO ~510

CONTROL INFORMATION COORDINATION PROCESS

STEERING CONTROL DEVICE AND STEERING CONTROL METHOD

CROSS-REFERENCE TO RELATED APPLICATION

This application claims priority to Japanese Patent Application No. 2023-112489 filed on Jul. 7, 2023, incorporated herein by reference in its entirety.

BACKGROUND

1. Technical Field

The present disclosure relates to a steering control device and a steering control method.

2. Description of Related Art

For example, Japanese Unexamined Patent Application Publication No. 2021-195084 describes a steer-by-wire type steering device that is equipped in a vehicle. The steer-by-wire type steering device includes a dynamic power transmission path that is cut off between a steering wheel of the vehicle and a turning wheel of the vehicle. The vehicle includes a reaction force control unit and a turning control unit for controlling the steer-by-wire type steering device. The reaction force control unit is configured to execute a rudder angle mid-point setting process for obtaining the neutral position of the steering wheel.

The above rudder angle mid-point setting process is a process for enabling controls of the steering device and the like when the vehicle travels. For example, in the case where the reaction force control unit has a circumstance in which the rudder angle mid-point setting process cannot be completed, it is not possible to enable the controls of the steering device and the like when the vehicle travels.

SUMMARY

In an aspect of the present disclosure, a steering control device is applied to a vehicle steering system for steering traveling of a vehicle. The steering control device includes a rudder angle control unit configured to execute a control in which a rudder angle variable obtained about the steering is referred to. The rudder angle control unit is configured to execute a control information setting process of setting control information that is a value indicating straight movement of the vehicle and that is a reference of the rudder angle variable. In the control information setting process, the rudder angle control unit enables a control to steer the traveling of the vehicle, by completing setting of the control information after an electric power source of the vehicle steering system is turned on. The rudder angle control unit includes control circuits configured to control the rudder angle variable in collaboration with each other. The control circuits are configured to capable of steering the traveling of the vehicle on condition that the setting of the control information has been completed in all of the control circuits in the execution of the control information setting process. The control information setting process includes a coordination process of performing coordination such that all of the control circuits are capable of completing the setting of the control information, when the setting of the control information has been completed in a first control circuit group among the control circuits while the setting of the control information has not been completed in a second control circuit group among the control circuits.

In the above configuration, even in the case where there is a control circuit in which the setting of the control information has not been completed, the coordination process is performed such that the setting of the control information in all of the control circuits can be completed. Thereby, it is possible to restrain the occurrence of a situation where the setting of the control information in all of the control circuits cannot be completed and this affair is repeated endlessly, for example. Accordingly, it is possible to restrain the prolongation of a period after the electric power source of the vehicle steering system is turned on and before the control to steer the traveling of the vehicle is enabled.

In the above steering control device, the coordination process may include a state coordination process of coordinating the state of the first control circuit group such that each control circuit in the first control circuit group transitions to a state of being capable of executing the control information setting process again. The first control circuit group may be configured such that each control circuit in the first control circuit group executes the control information setting process again after coordination by the state coordination process.

In the above configuration, in the coordination process, the state coordination process makes it possible to cause the control circuit in which the setting of the control information has been completed to execute the control information setting process again. Thereby, it is possible to cause all of the control circuits to execute the control information setting process again, regardless of whether the setting of the control information has been completed. This state coordination process is a technique that is particularly effective, for example, in the case where each of the control circuits sets the control information, for example, by rotating the steering wheel of the vehicle.

The above vehicle steering system may include a dynamic power transmission path that is cut off between a steering unit and a turning unit, the steering unit being steered by a steering wheel of the vehicle, the turning unit operating so as to turn a turning wheel of the vehicle. The rudder angle control unit may include a reaction force control unit that includes first control circuits. The reaction force control unit may be configured to control operation of the steering unit such that a steering reaction force is given to the steering wheel, by referring to a steering variable that is obtained about the steering from the steering unit. Each of the first control circuits of the reaction force control unit may be configured to execute the control information setting process based on respective values that are acquired when the steering wheel is rotated to limit positions in a first direction and a second direction. Each of the first control circuits of the reaction force control unit may be configured to execute the state coordination process in the control information setting process.

In the above configuration, by the state coordination process, the setting of the control information in all of the control circuits of the reaction force control unit can be completed. Thereby, even in the case where each of the control circuits of the reaction force control unit sets the control information, for example, by rotating the steering wheel of the vehicle, all of the control circuits can execute the control information setting process again. That is, it is possible to restrain the occurrence of a matter in which the steering wheel of the vehicle cannot be rotated due to the difference in the internal state among the control circuits of the reaction control unit, for example.

In the above steering control device, the coordination process may include a control information coordination process of coordinating the second control circuit group such that the setting of the control information is completed by setting the control information using the control information after setting completion in the first control circuit group. The control circuits may be configured such that the setting of the control information is completed in all of the control circuits after coordination by the control information coordination process.

In the above configuration, in the coordination process, the control information coordination process makes it possible to cause the setting of the control information to be completed also in the control circuit in which the setting of the control information has not been completed, using the control information after setting completion in the control circuit in which the setting of the control information has been completed. Thereby, when there is the control circuit in which the setting of the control information has been completed, it is possible to complete the setting of the control information in all of the control circuits. This control information coordination process is a technique that is particularly effective, for example, in the case where each of the control circuits sets the control information by correcting the rudder angle variable.

The above vehicle steering system may include a dynamic power transmission path that is cut off between a steering unit and a turning unit, the steering unit being steered by a steering wheel of the vehicle, the turning unit operating so as to turn a turning wheel of the vehicle. The rudder angle control unit may include a turning control unit that includes second control circuits. The turning control unit may be configured to control operation of the turning unit such that a turning force is given to the turning wheel, by referring to a turning variable that is obtained about the steering from the turning unit. Each of the second control circuits of the turning control unit may be configured to execute the control information setting process by correcting the turning variable using a correction variable acquired from the turning unit in addition to the turning variable. Each of the second control circuits of the turning control unit may be configured to execute the control information coordination process in the control information setting process.

In the above configuration, the control information coordination process makes it possible to complete the setting of the control information in all of the control circuits of the turning control unit. Thereby, even in the case where each of the control circuits of the turning control unit sets the control information by correcting the turning variable using the correction information that is obtained other than the turning variable, all of the control circuits can complete the setting of the control information. That is, even when the control circuits of the turning control unit include a control circuit that has failed to acquire the turning variable or the correction variable, it is possible to quickly cope.

The above vehicle steering system may include a dynamic power transmission path that is cut off between a steering unit and a turning unit, the steering unit being steered by a steering wheel of the vehicle, the turning unit operating so as to turn a turning wheel of the vehicle. The rudder angle control unit may include a reaction force control unit that includes first control circuits and a turning control unit that includes second control circuits. The reaction force control unit may be configured to control operation of the steering unit such that a steering reaction force is given to the steering wheel, by referring to a steering variable that is obtained about the steering from the steering unit. The turning control unit may be configured to control operation of the turning unit such that a turning force is given to the turning wheel, by referring to a turning variable that is obtained about the steering from the turning unit. The coordination process may include a state coordination process of coordinating the state of the first control circuit group such that each control circuit in the first control circuit group transitions to a state of being capable of executing the control information setting process again, and a control information coordination process of coordinating the second control circuit group such that the setting of the control information is completed by setting the control information using the control information after setting completion in the first control circuit group. Each of the first control circuits of the reaction force control unit may be configured to execute the state coordination process in the control information setting process. Each of the first control circuits may be configured to execute the control information setting process again after the coordination by the state coordination process, when the state coordination process is executed. Each of the second control circuits of the turning control unit may be configured to execute the control information coordination process in the control information setting process. The second control circuits may be configured such that the setting of the control information is completed in all of the control circuits after the coordination by the control information coordination process, when the control information coordination process is executed.

Another aspect of the present disclosure is a steering control method of a vehicle steering system for steering traveling of a vehicle. The steering control method includes a rudder angle control process of executing a control in which a rudder angle variable obtained about the steering is referred to. The rudder angle control process includes setting control information that is a value indicating straight movement of the vehicle and that is a reference of the rudder angle variable. The setting the control information enables a control to steer the traveling of the vehicle, by completing setting of the control information after an electric power source of the vehicle steering system is turned on. The rudder angle control process includes a process that is executed by control circuits configured to control the rudder angle variable in collaboration with each other. The process that is executed by the control circuits enables the control to steer the traveling of the vehicle on condition that the setting of the control information has been completed in all of the control circuits in the setting of the control information in the control circuits. The setting the control information includes performing coordination such that all of the control circuits are capable of completing the setting of the control information, when the setting of the control information has been completed in a first control circuit group among the control circuits while the setting of the control information has not been completed in a second control circuit group among the control circuits.

According to the present disclosure, it is possible to restrain the prolongation of the period after the electric power source of the vehicle steering system is turned on and before the control to steer the traveling of the vehicle is enabled.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 7 is a diagram showing a manner in which a control information coordination process is executed in a turning CPU.

DETAILED DESCRIPTION OF EMBODIMENTS

Figure 1:
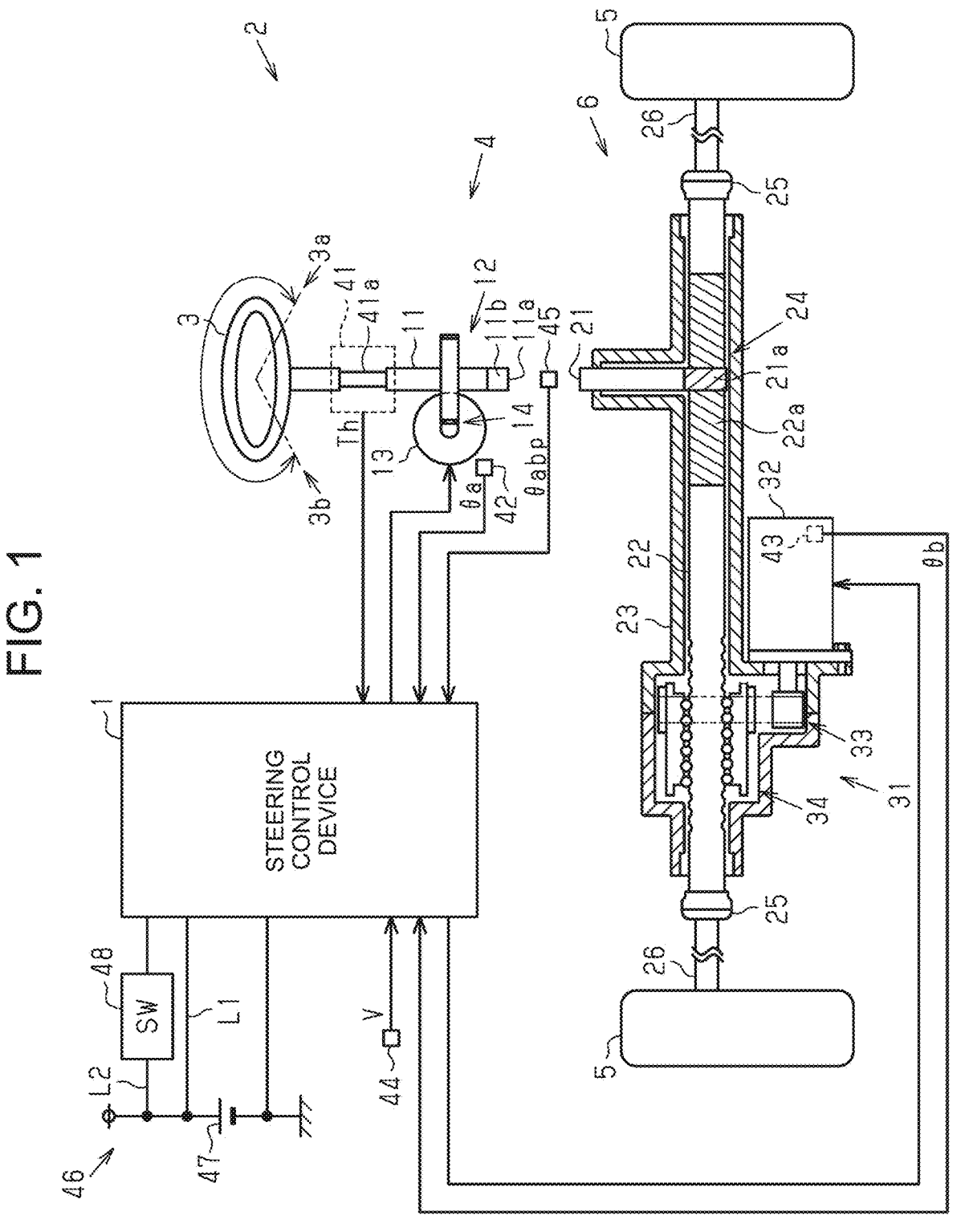
FIG. 1 is a diagram showing the configuration of a steer-by-wire type steering device according to an embodiment.

A steering control device according to an embodiment will be described. As shown in FIG. 1, a vehicle steering system 2 includes a steering control device 1. The vehicle steering system 2 includes a steering unit 4 and a turning unit 6. The steering unit 4 is steered by a driver through a steering wheel 3 of a vehicle that is a steering member. The turning unit 6 turns right and left turning wheels 5 of the vehicle, in response to the steering that is input to the steering unit 4 by a driver. For example, the vehicle steering system 2 in the embodiment has a structure in which a dynamic power transmission path between the steering unit 4 and the turning unit 6 is mechanically cut off at all times. A dynamic power transmission path between a later-described steering actuator 12 and a later-described turning actuator 31 is mechanically cut off at all times. That is, the vehicle steering system 2 includes a steer-by-wire type steering device.

The steering unit 4 includes a steering shaft 11 and the steering actuator 12. The steering shaft 11 is coupled to the steering wheel 3. At an end portion 11a of the steering shaft 11 on the opposite side of a side on which the steering shaft 11 is coupled to the steering wheel 3, a stopper mechanism 11b is provided. The stopper mechanism 11b specifies the rotation range of the steering shaft 11. Thereby, the rotation range of the steering wheel 3 that rotates integrally with the steering shaft 11 is specified by the stopper mechanism 11b. For example, the steering wheel 3 can rotate such that the rotation range is a range between a rightward limit position 3a and a leftward limit position 3b.

The steering actuator 12 includes a reaction force motor 13 and a steering-side speed reduction mechanism 14. The reaction force motor 13 is a steering-side motor that gives a steering reaction force that is a force against the steering of the steering wheel 3, to the steering wheel 3 through the steering shaft 11. For example, the reaction force motor 13 is coupled to the steering shaft 11 through the steering-side speed reduction mechanism 14 that is constituted by a worm and wheel. As the reaction force motor 13 in the embodiment, for example, a three-phase brushless motor is employed.

The turning unit 6 includes a pinion shaft 21, a rack shaft 22 as a turning shaft, and a rack housing 23. The pinion shaft 21 and the rack shaft 22 are coupled to each other at a predetermined crossing angle. A pinion tooth 21a formed on the pinion shaft 21 engages with a rack tooth 22a formed on the rack shaft 22, and thereby, a rack-and-pinion mechanism 24 is constituted. The pinion shaft 21 corresponds to a rotation shaft allowing the conversion into a turning angle θi that is the turning position of the turning wheel 5. The rack housing 23 houses the rack-and-pinion mechanism 24.

One end of the pinion shaft 21 on the opposite side of a side on which the pinion shaft 21 is coupled to the rack shaft 22 protrudes from the rack housing 23. Both ends of the rack shaft 22 protrude from both ends of the rack housing 23 in the axial direction of the rack housing 23. Tie rods 26 are coupled to both ends of the rack shaft 22 through rack ends 25 each of which is a ball joint. Distal ends of the tie rods 26 are coupled to unillustrated knuckles to which the right and left turning wheels 5 are attached respectively.

The turning unit 6 includes the turning actuator 31. The turning actuator 31 includes a turning motor 32, a transmission mechanism 33, and a transformation mechanism 34. The turning motor 32 is a turning-side motor that gives a turning force for turning the turning wheels 5, to the rack shaft 22 through the transmission mechanism 33 and the transformation mechanism 34. For example, the turning motor 32 transmits rotation to the transformation mechanism 34 through the transmission mechanism 33 that is a belt transmission mechanism. For example, the transmission mechanism 33 transforms the rotation of the turning motor 32 into the reciprocating motion of the rack shaft 22 through the transformation mechanism 34 that is a ball screw mechanism. As the turning motor 32 in the embodiment, for example, a three-phase brushless motor is employed.

In the vehicle steering system 2, in response to the steering of the steering wheel 3 by the driver, the motor torque is given as the turning force from the turning actuator 31 to the rack shaft 22, and thereby, the turning angle θi of the turning wheels 5 is altered. At this time, the steering reaction force against the steering by the driver is given from the steering actuator 12 to the steering wheel 3. Thereby, in the vehicle steering system 2, a steering torque Th necessary for the steering of the steering wheel 3 is altered by the steering reaction force that is the motor torque given from the steering actuator 12.

The reason why the pinion shaft 21 is provided is because the rack shaft 22 is supported in the interior of the rack housing 23 together with the pinion shaft 21. By an unillustrated support mechanism that is provided in the vehicle steering system 2, the rack shaft 22 is supported so as to be capable of moving along the axial direction of the rack shaft 22, and is pressed to the pinion shaft 21. Thereby, the rack shaft 22 is supported in the interior of the rack housing 23. Another support mechanism for supporting the rack shaft 22 in the rack housing 23 may be provided without using the pinion shaft 21.

Electric Configuration of Steering Device

As shown in FIG. 1, the reaction force motor 13 and the turning motor 32 are connected to the steering control device 1. The steering control device 1 controls the actuations of the respective motors 13, 32.

To the steering control device 1, detection results of various sensors are input. Examples of the various sensors include a torque sensor 41, a steering-side rotational angle sensor 42, a turning-side rotational angle sensor 43, a vehicle velocity sensor 44, and a pinion absolute angle sensor 45.

The torque sensor 41 is provided at a portion of the steering shaft 11 between the steering wheel 3 and the steering-side speed reduction mechanism 14. The torque sensor 41 detects a steering torque Th that is a value indicating a torque that is given to the steering shaft 11 by the steering of the steering wheel 3 by the driver. The steering torque Th is detected based on the torsion of a torsion bar 41a that is in the middle of the steering shaft 11 and that is provided in the steering shaft 11 between the steering wheel 3 and the steering-side speed reduction mechanism 14. The steering-side rotational angle sensor 42 is provided at the reaction force motor 13. The steering-side rotational angle sensor 42 detects a rotational angle θa that is the rotation angle of a rotation shaft of the reaction force motor 13 and that is an angle within a range of 360 degrees. The turning-side rotational angle sensor 43 is provided at the turning motor 32. The turning-side rotational angle sensor 43 detects a rotational angle θb that is the rotation angle of a rotation shaft of the turning motor 32 and that is an angle within a range of 360 degrees. The vehicle velocity sensor 44 detects a vehicle velocity V that is the traveling velocity of the vehicle. The pinion absolute angle sensor 45 is provided at the pinion shaft 21. The pinion absolute angle sensor 45 detects a pinion absolute rotational angle θabp that is an actual measurement value of the angle of the rotation shaft of the pinion shaft 21, in a range exceeding 360°. In the embodiment, the rotational angle θa and the rotational angle θb are examples of the rudder angle variable. Further, the rotational angle θa is an example of the steering variable. Further, the rotational angle θb is an example of the turning variable. Further, the pinion absolute rotational angle θabp is an example of the correction variable.

To the steering control device 1, an electric power source system 46 is connected. The electric power source system 46 includes a battery 47. The battery 47 is a secondary battery that is equipped in the vehicle, and is an electric power source of electric power that is supplied for operating the reaction force motor 13 and the turning motor 32. Further, the battery 47 is an electric power source of electric power that is supplied for operating the steering control device 1.

A start switch 48 (a "SW" in FIG. 1) for the vehicle, as exemplified by an ignition switch, is provided between the steering control device 1 and the battery 47. The start switch 48 is provided in the middle of an electric supply line L2 that is of two electric supply lines L1, L2 connecting the steering control device 1 and the battery 47 and that diverges from the electric supply line L1. The start switch 48 is handled when various functions are started such that a traveling drive source for the vehicle, as exemplified by an engine, is actuated and the vehicle can operate. The electric continuity of the electric supply line L2 is turned on or off through the handling of the start switch 48. In the embodiment, the state of the operation of the vehicle steering system 2 is associated with the state of the operation of the vehicle. The electric supply line L1 is electrically continuous at all times, basically, but the electric continuity of the electric supply line L1 is indirectly turned on or off depending on the state of the operation of the vehicle steering system 2, as the function of the vehicle steering system 2. The state of the operation of the vehicle steering system 2 is associated with the on-off state of the electric continuity of the electric supply lines L1, L2, which is the state of the supply of the electric power of the battery 47. In the state of the operation of the vehicle steering system 2, the electric power source is turned on when the electric continuity of the electric supply lines L1, L2 is turned on based on the handling of the start switch 48. In the state of the operation of the vehicle steering system 2, the electric power source is turned off when the electric continuity of the electric supply lines L1, L2 is turned off based on the handling of the start switch 48.

Function of Steering Control Device

Figure 2:
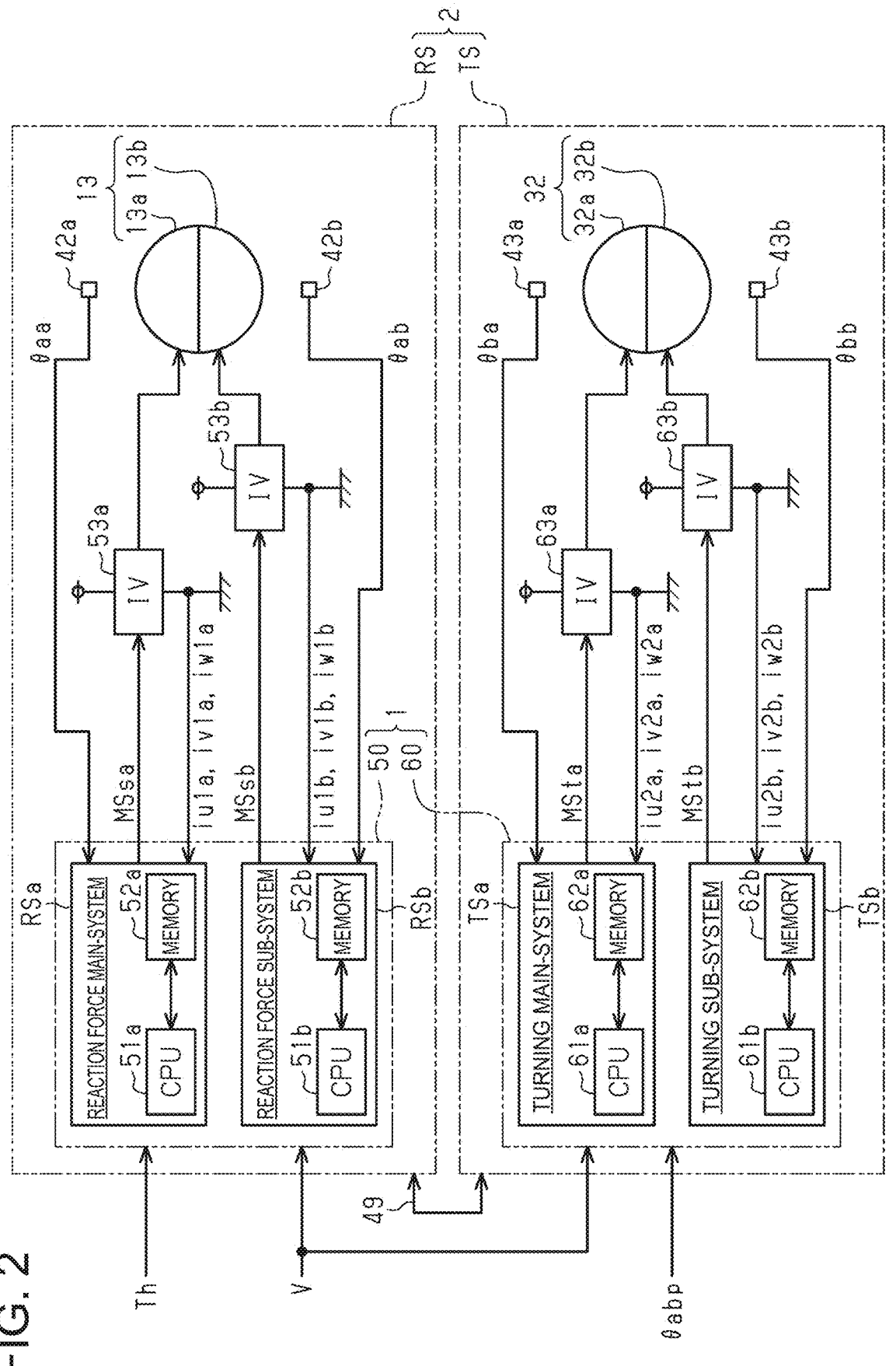
FIG. 2 is a block diagram showing the electric configuration of a steering control device in FIG. 1.

As shown in FIG. 2, the steering control device 1 includes a reaction force control unit 50 and a turning control unit 60. The reaction force control unit 50 controls the steering wheel 3 that is a control object. For controlling the steering reaction force that is a controlled variable of the control object, the reaction force control unit 50 controls the drive of the steering actuator 12, more specifically, the drive of the reaction force motor 13. The turning control unit 60 controls the rack shaft 22 that is a control object. For controlling the turning force that is a controlled variable of the control object, the turning control unit 60 controls the drive of the turning actuator 31, more specifically, the drive of the turning motor 32. For example, the reaction force control unit 50 and the turning control unit 60 mutually perform the sending and receiving of information through a local network 49 for serial communication or the like. The reaction force control unit 50 constitutes a reaction force system RS by being combined with the steering unit 4. The turning control unit 60 constitutes a turning system TS by being combined with the turning unit 6. A process by which the reaction force control unit 50 controls the drive of the reaction force motor 13 is a reaction force control process. A process by which the turning control unit 60 controls the drive of the turning motor 32 is a turning control process. In the embodiment, the reaction force control unit 50 and the turning control unit 60 are examples of the rudder angle control unit. Further, the reaction force control process and the turning control process are examples of the rudder angle control process.

The reaction force control unit 50 includes a central processing unit (referred to as a "CPU" hereinafter) 51 and a memory 52. The CPU 51 executes programs stored in the memory 52, with a predetermined computation period, and thereby, the reaction force control unit 50 executes various processes. The turning control unit 60 includes a central processing unit (referred to as a "CPU" hereinafter) 61 and a memory 62. The CPU 61 executes programs stored in the memory 62, with a predetermined computation period, and thereby, the turning control unit 60 executes various processes. The CPUs 51, 61 and the memories 52, 62 constitute microcomputers that are processing circuits. The memories 52, 62 include computer-readable media such as random access memories (RAMs) and read only memories (ROMs). The realization of various processes by software is an example. The processing circuits included in the reaction force control unit 50 and the turning control unit 60 may be configured such that at least some processes are realized by hardware circuits such as logic circuits.

The reaction force control unit 50 includes a plurality of control systems in which the CPU 51 and the memory 52 are combined such that various processes are executed. For example, the plurality of control systems is constituted by two systems that include a reaction force main-system RSa having a main-CPU 51a and a main-memory 52a and a reaction force sub-system RSb having a sub-CPU 51b and a sub-memory 52b. The same goes for the turning control unit 60. That is, the turning control unit 60 includes a plurality of control systems in which the CPU 61 and the memory 62 are combined such that various processes are executed. For example, the plurality of control systems is constituted by two systems that include a turning main-system TSa having a main-CPU 61a and a main-memory 62a and a turning sub-system TSb having a sub-CPU 61b and a sub-memory 62b. In the embodiment, the CPUs 51a, 51b and the CPUs

61*a*, 61*b* are examples of the control circuit. Processes that are executed by the CPUs 51*a*, 51*b* and the CPUs 61*a*, 61*b* are examples of the control circuit process.

The CPUs 51*a*, 51*b* of the reaction force control unit 50 receive the steering torque Th, the vehicle velocity V, and the rotational angle θa. In the embodiment, the steering-side rotational angle sensor 42 includes a sensor 42*a* for the reaction force main-system RSa and a sensor 42*b* for the reaction force sub-system RSb. The main-CPU 51*a* receives the rotational angle θa that is a rotational angle θaa that is detected by the sensor 42*a*. The sub-CPU 51*b* receives the rotational angle θa that is a rotational angle θab that is detected by the sensor 42*b*. In addition, the CPUs 51*a*, 51*b* receive turning information that is obtained from the turning control unit 60 through the local network 49. The CPUs 51*a*, 51*b* compute a control signal MSs for controlling the steering reaction force, which is a signal to be output to a reaction force inverter 53, based on a variety of information including the steering torque Th, the vehicle velocity V, and the rotational angle θa. The reaction force inverter 53 is a drive circuit that transforms the direct-current voltage of the battery 47 into alternating-current voltage and that applies the alternating-current voltage to the reaction force motor 13. On that occasion, the CPUs 51*a*, 51*b* refer to electric currents iu1, iv1, iw1 that flow through the reaction force motor 13. The electric currents iu1, iv1, iw1 are quantified as voltage drop quantities at shunt resistors that are provided at respective legs of the reaction force inverter 53.

In the embodiment, the reaction force inverter 53 includes an inverter 53*a* for the reaction force main-system RSa and an inverter 53*b* for the reaction force sub-system RSb. The inverter 53*a* applies voltage to a main-winding group 13*a* included in the reaction force motor 13. The inverter 53*b* applies voltage to a sub-winding group 13*b* included in the reaction force motor 13. The main-CPU 51*a* computes a control signal MSsa that is output to the inverter 53*a*, and refers to electric currents iu1*a*, iv1*a*, iw1*a* in the inverter 53*a*. The sub-CPU 51*b* computes a control signal MSsb that is output to the inverter 53*b*, and refers to electric currents iu1*b*, iv1*b*, iw1*b* in the inverter 53*b*. Thereby, the CPUs 51*a*, 51*b* control the drive of the reaction force motor 13, such that the motor torque that causes the steering reaction force is generated.

The CPUs 51*a*, 51*b* convert the rotational angle θa into an integrated rotation angle that is an integrated value from a reaction force reference value θns stored in the memories 52*a*, 52*b*, that is, into an absolute rotation angle. The absolute rotation angle is a value converted in a range exceeding 360° by counting the number of times of the rotation of the reaction force motor 13 from the reaction force reference value θns. For example, the reaction force reference value θns is a value indicating a straight-movement state that is the steering state of the steering wheel 3 when the vehicle moves straight. In the embodiment, the reaction force reference value θns is a value indicating a steering neutral position that is the rotational position of the steering wheel 3 in the straight-movement state, and is an example of control information. Each of the CPUs 51*a*, 51*b* computes a steering angle θs by multiplying the absolute rotation angle obtained by the conversion by a conversion factor based on the rotation velocity ratio of the steering-side speed reduction mechanism 14. Each of the CPUs 51*a*, 51*b* computes the steering angle θs as an absolute angle with respect to the steering neutral position, that is, the reaction force reference value θns. The steering angle θs obtained in this way is used in the computation of the control signal MSs. Steering information that is used by the CPUs 51*a*,

51*b*, as exemplified by the steering angle θs, is output to the turning control unit 60 through the local network 49.

The CPUs 61*a*, 61*b* of the turning control unit 60 receive the vehicle velocity V, the rotational angle θb, and the pinion absolute rotational angle θabp. In the embodiment, the turning-side rotational angle sensor 43 includes a sensor 43*a* for the turning main-system TSa and a sensor 43*b* for the turning sub-system TSb. The main-CPU 61*a* receives the rotational angle θb that is a rotational angle θba that is detected by the sensor 43*a*. The sub-CPU 61*b* receives the rotational angle θb that is a rotational angle θbb that is detected by the sensor 43*b*. In addition, the CPUs 61*a*, 61*b* receive the steering information that is obtained from the reaction force control unit 50 through the local network 49. The CPUs 61*a*, 61*b* compute a control signal MSt for controlling the turning force, which is a signal to output to a turning inverter 63, based on a variety of information including the vehicle velocity V, the rotational angle θb, and the pinion absolute rotational angle θabp. The turning inverter 63 is a drive circuit that transforms the direct-current voltage of the battery 47 into alternating-current voltage and that applies the alternating-current voltage to the turning motor 32. On that occasion, the CPUs 61*a*, 61*b* refer to electric currents iu2, iv2, iw2 that flow through the turning motor 32. The electric current iu2, iv2, iw2 are quantified as voltage drop quantities at shunt resistors that are provided at respective legs of the turning inverter 63.

In the embodiment, the turning inverter 63 includes an inverter 63*a* for the turning main-system TSa and an inverter 63*b* for the turning sub-system TSb. The inverter 63*a* applies voltage to a main-winding group 32*a* included in the turning motor 32. The inverter 63*b* applies voltage to a sub-winding group 32*b* included in the turning motor 32. The main-CPU 61*a* computes a control signal MSta that is output to the inverter 63*a*, and refers to electric currents iu2*a*, iv2*a*, iw2*a* in the inverter 63*a*. The sub-CPU 61*b* computes a control signal MStb that is output to the inverter 63*b*, and refers to electric currents iu2*b*, iv2*b*, iw2*b* in the inverter 63*b*. Thereby, the CPUs 61*a*, 61*b* control the drive of the turning motor 32, such that the motor torque that causes the turning force is generated.

The CPUs 61*a*, 61*b* convert the rotational angle θb into an integrated rotation angle that is an integrated value from a turning reference value θnt stored in the memories 62*a*, 62*b*, that is, into an absolute rotation angle. The absolute rotation angle is a value converted in a range exceeding 360° by counting the number of times of the rotation of the turning motor 32 from the turning reference value θnt. For example, the turning reference value θnt is a value indicating a straight-movement state that is the turning state of the rack shaft 22 when the vehicle moves straight. In the embodiment, the turning reference value θnt is a value indicating a rack neutral position that is the position of the rack shaft 22 in the straight-movement state, and is an example of the control information. Each of the CPUs 61*a*, 61*b* computes a pinion angle θp by multiplying the absolute rotation angle obtained by the conversion by a conversion factor based on the rotation velocity ratio of the transmission mechanism 33, a lead of the transformation mechanism 34, and the rotation velocity ratio of the rack-and-pinion mechanism 24. Each of the CPUs 61*a*, 61*b* computes the pinion angle θp that is the actual rotational angle of the pinion shaft 21, as an absolute angle with respect to the rack neutral position, that is, the turning reference value θnt. The pinion angle θp obtained in this way is used in the computation of the control signal MSt. The turning information that is used by the CPUs 61*a*, 61b, as exemplified by the pinion angle θp, is output to the reaction force control unit 50 through the local network 49.

Processes to be Executed in Starting State

After the start switch 48 is turned on in the off-state of the electric power source and the electric power source is turned on, the steering control device 1 transitions to a starting state before the transition to an ordinary control state. In this case, depending on whether an IG signal sg output by the start switch 48 has been input, each of the CPUs 51a, 51b of the reaction force control unit 50 determines whether the electric power source is in the on-state or in the off-state, and executes processes such as an initial check process. Similarly, each of the CPUs 61a, 61b of the turning control unit 60 determines whether the electric power source is in the on-state or in the off-state, and executes processes such as an initial check process. Hereinafter, the CPUs 51a, 51b of the reaction force control unit 50 are collectively referred to as a "reaction force CPU", occasionally. Further, the CPUs 61a, 61b of the turning control unit 60 are collectively referred to as a "turning CPU", occasionally. Further, the "reaction force CPU" and the "turning CPU" are collectively referred to as a "steering CPU", occasionally.

Figure 3:
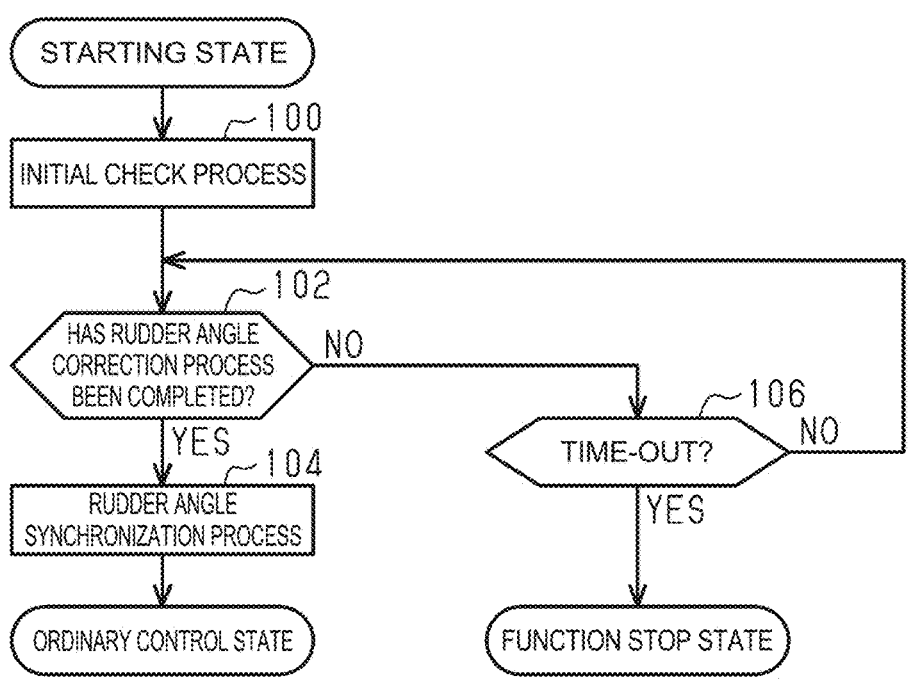
FIG. 3 is a flowchart showing a procedure of a process that is executed by a steering CPU in FIG. 1 in a starting state.

As shown in FIG. 3, in the starting state, the steering CPU executes the initial check process (step 100). The initial check process includes a check process about the operation of the reaction force system RS and the turning system TS, as exemplified by a check process about whether each CPU and each memory of the steering CPU normally operate. The initial check process includes a check process about the communication through the local network 49. The initial check process includes a check process about the reading of a variety of information from the memory corresponding to each CPU of the steering CPU. In the initial check process, the variety of information that is read by the steering CPU from the memory corresponding to each CPU includes the reaction force reference value θns and the turning reference value θnt.

Subsequently, the steering CPU determines whether a rudder angle correction process has been completed (step 102). In step 102, the steering CPU determines that the rudder angle correction process has been completed, in the case where the steering CPU can determine that respective processes in the reaction force side and the turning side have been completed. In this case, the reaction force control unit 50 determines that the process in the reaction force side has been completed, in the case where the reaction force control unit 50 can determine that respective processes in the systems RSa, RSb have been completed. Similarly, the turning control unit 60 determines that the process in the turning side has been completed, in the case where the turning control unit 60 can determine that respective processes in the systems TSa, TSb have been completed. The rudder angle correction process will be described later in detail.

Subsequently, in the case where the steering CPU determines that the rudder angle correction process has been completed (step 102: YES), the steering CPU executes a rudder angle synchronization process (step 104). The rudder angle synchronization process includes a process of synchronizing the positional relation between the steering wheel 3 and the turning wheels 5 based on at least one of the rotation of the steering wheel 3 and the turning of the turning wheels 5. As a result of the rudder angle synchronization process, the steering angle θs that is the rotational position of the steering wheel 3 has a predetermined correspondence relation with the turning angle θi that is the turning position of the turning wheels 5, that is, with the pinion angle θp.

Thereafter, the steering CPU transitions to the ordinary control state, because the process in the starting state has been completed. The ordinary control state is a state of execution of an ordinary reaction force process and ordinary turning process about a steering control for operating the steering unit 4 and the turning unit 6 in response to the steering operation by the driver. In this case, the reaction force system RS causes the steering unit 4 to operate in cooperation with the turning unit 6. Further, the turning system TS causes the turning unit 6 to operate in cooperation with the steering unit 4.

On the other hand, in the case where the rudder angle correction process is being executed in step 102 (step 102: NO), the steering CPU determines whether time-out has occurred (step 106). In step 106, the steering CPU determines whether an elapsed time from the start of the rudder angle correction process has exceeded an upper limit time for meeting a time-out condition. In the embodiment, for example, the upper limit time is a value in a range in which the rudder angle correction process in the steering side can be repeated multiple times.

Subsequently, in the case where the time-out condition is not met (step 106: NO), the steering CPU continues the process in step 102, that is, the execution of the rudder angle correction process. On the other hand, in the case where the time-out condition is met (step 106: YES), the steering CPU cannot complete the process in the starting state, and therefore, transitions to a function stop state in which the stop of the function of the steering control device 1 and the like are performed.

Rudder Angle Correction Process in Reaction Force Side

Figure 4:
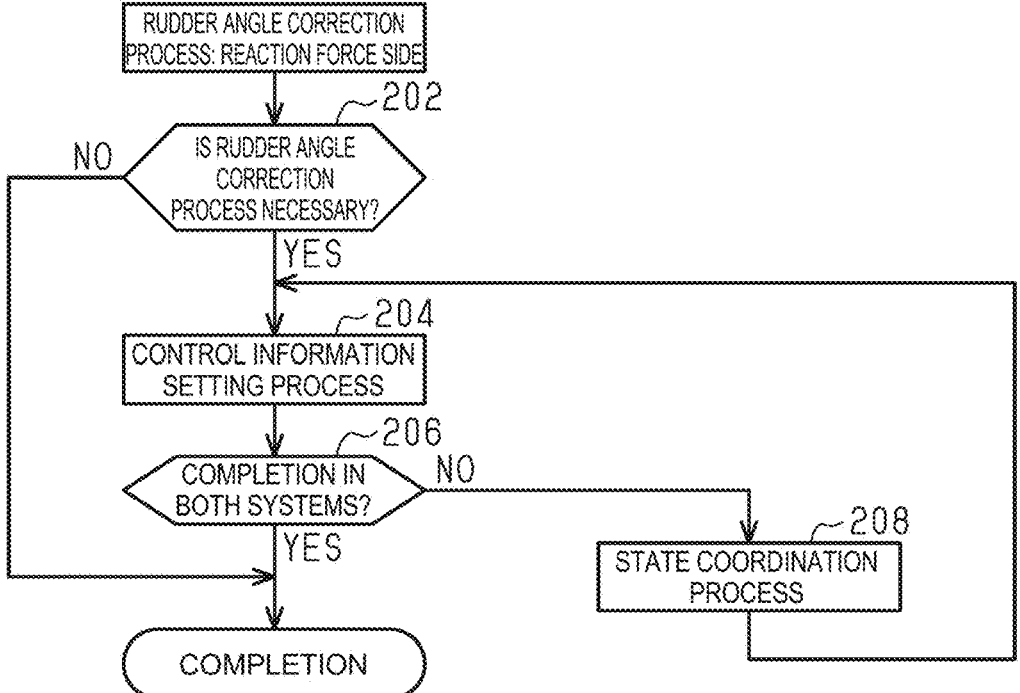
FIG. 4 is a flowchart showing a processing procedure in a reaction force side in a rudder angle correction process in FIG. 3.

As shown in FIG. 4, in the rudder angle correction process in the reaction force side, the reaction force CPU determines whether the rudder angle correction process needs to be executed (step 202). In step 202, the reaction force CPU determines that the rudder angle correction process needs to be executed, in the case where the reaction force CPU cannot read the reaction force reference value θns in the initial check process (step 100). The reaction force CPU cannot read the reaction force reference value θns in the initial check process, in the case where the reaction force reference value θns has not been internally set. For example, in a state after the battery 47 is detached and replaced, the reaction force reference value θns has not been internally set. Similarly, in a state after reading abnormality or writing abnormality about the reaction force reference value θns occurs, the reaction force reference value θns has not been internally set.

Subsequently, in the case where the reaction force CPU can read the reaction force reference value θns in the initial check process (step 100) and therefore does not need to execute the rudder angle correction process (step 202: NO), the reaction force CPU ends the process, and completes the rudder angle correction process in the reaction force side. Notice of the completion of the process in the reaction force side is given to the turning CPU through the local network 49. In the case where both the completion of the process in the reaction force side and the receiving of notice of the completion of the rudder angle correction process in the turning side from the turning CPU are met, the reaction force CPU can make the determination of YES in step 102.

On the other hand, in the case where the reaction force CPU cannot read the reaction force reference value θns in the initial check process (step 100) and therefore needs to execute the rudder angle correction process (step 202: YES), the reaction force CPU executes a control information setting process (step 204). In step 204, the control information setting process that is executed by the reaction force CPU includes a process of referring to the rotational angle θa. The reaction force CPU includes an integrated rotation angle acquisition process for computing a provisional steering angle θsi that is an integrated value that is obtained using the position of the rotational angle θa when the electric power source is in the on-state as a provisional reference value. The provisional steering angle θsi is an integrated rotation angle, that is, an absolute rotation angle. The control information setting process in the reaction force side includes a learning process in which each CPU of the reaction force CPU acquires values by rotating the steering wheel 3 to the limit positions 3a, 3b in the right and left directions.

Figure 6:
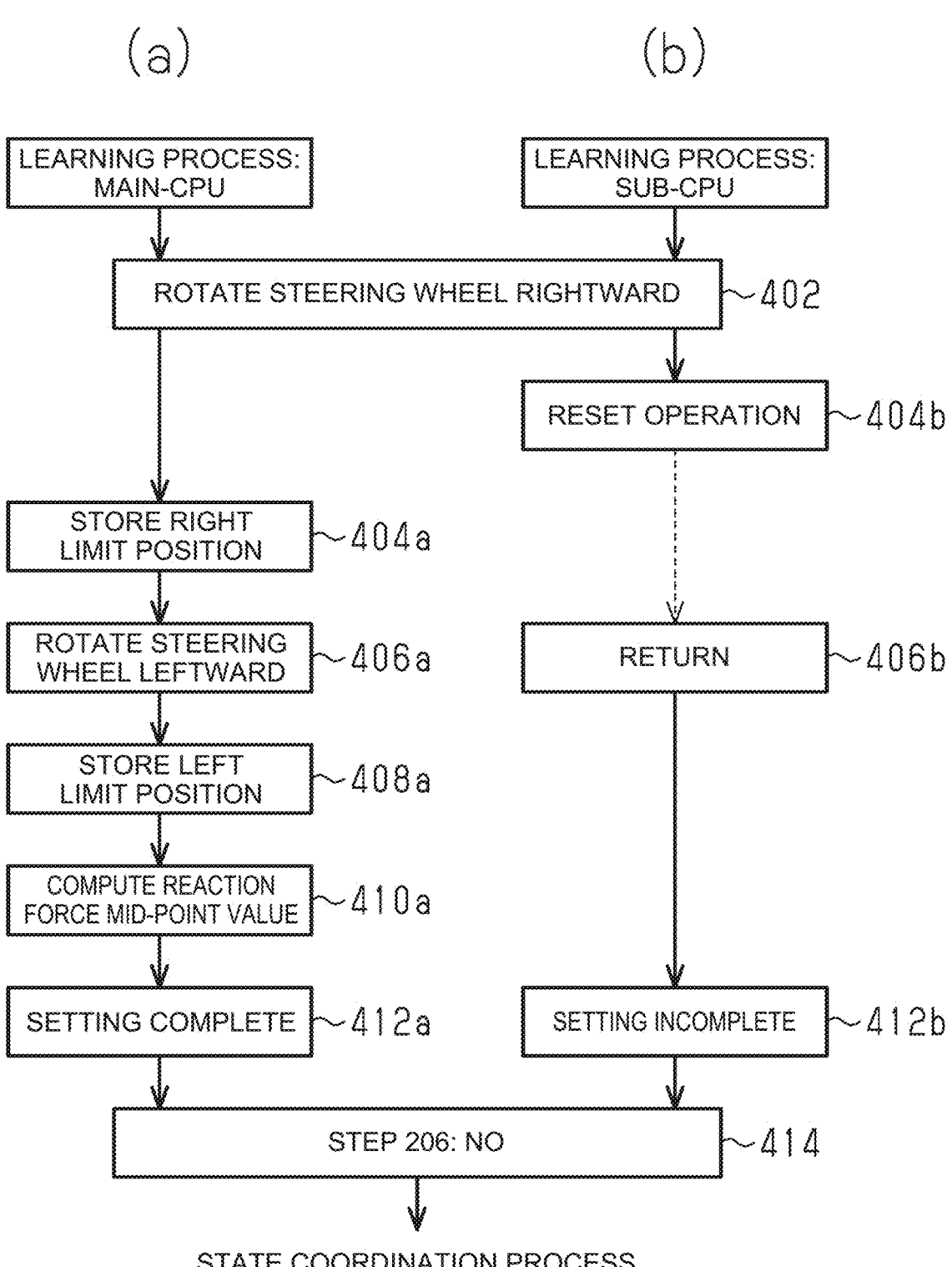
FIG. 6 is a diagram showing a manner in which a state coordination process is executed in a reaction force CPU.

For example, as shown in FIG. 6, the learning process includes a process of rotating the steering wheel 3 in one of the right and left directions, that is, in the rightward direction that is a first direction. The rotation of the steering wheel 3 is executed by such a feedback control that the provisional steering angle θsi follows a target steering angle θs*. The target steering angle θs* is a value that is gradually changed and updated so as to exceed the rightward limit position 3a from the value of the provisional steering angle θsi at the time of the start of the learning process.

Further, the learning process includes a process of temporarily storing a right limit position θrl in the case where the steering wheel 3 has reached the rightward limit position 3a. Whether the steering wheel 3 has reached the limit position 3a is determined, for example, by monitoring the electric currents iu1, iv1, iw1, the steering torque Th, and an angular velocity ωs that is a change amount of the provisional steering angle θsi. The right limit position θrl is the provisional steering angle θsi when it is determined that the steering wheel 3 has reached the rightward limit position 3a.

Further, the learning process includes a process of rotating the steering wheel 3 in the other of the right and left directions, that is, in the leftward direction that is a second direction. This process is executed by such a feedback control that the provisional steering angle θsi follows the target steering angle θs*, similarly to the process of rotating the steering wheel 3 in the rightward direction. The target steering angle θs* is a value that is gradually changed and updated so as to exceed the leftward limit position 3b from the value of the provisional steering angle θsi when the steering wheel 3 has reached the rightward limit position 3a.

Further, the learning process includes a process of temporarily storing a left limit position θll in the case where the steering wheel 3 has reached the leftward limit position 3b. Whether the steering wheel 3 has reached the limit position 3b is determined, for example, by monitoring the electric currents iu1, iv1, iw1, the steering torque Th, and the angular velocity ωs that is a change amount of the provisional steering angle θsi, similarly to the determination about whether the steering wheel 3 has reached the rightward limit position 3a. The left limit position θll is the provisional steering angle θsi when it is determined that the steering wheel 3 has reached the leftward limit position 3b.

Further, the learning process includes a process of computing a value corresponding to one-half of the sum of the temporarily stored right limit position θrl and left limit position θll, as a reaction force mid-point value θcs. The reaction force mid-point value θcs obtained in this way is written and set as the reaction force reference value θns, by the reaction force CPU, that is, by each of the CPUs 51a, 51b.

Subsequently, the reaction force CPU determines whether the setting of the reaction force reference value θns has been completed in both systems (step 206). In step 206, the reaction force CPU determines whether the setting of the reaction force reference value θns has been completed by each of the CPUs 51a, 51b. Further, the reaction force CPU determines whether there is a CPU in a system in which the setting of the reaction force reference value θns has not been completed while there is a CPU in a system in which the setting of the reaction force reference value θns has been completed. During the learning process, the CPUs 51a, 51b give notice of the completion of the setting of the reaction force reference value θns, to each other, as the result of the learning process, by inter-microcomputer communication or the like.

The reaction force CPU does not execute step 206 when neither of the CPUs 51a, 51b has completed the setting of the reaction force reference value θns. In the case where neither of the CPUs 51a, 51b has completed the setting of the reaction force reference value θns in this way, the time-out condition is met in time (step 106: YES), so that the steering CPU transitions to the function stop state.

Subsequently, in the case where the setting of the reaction force reference value θns has been completed by each of the CPUs 51a, 51b and thereby the setting of the reaction force reference value θns has been completed in both systems (step 206: YES), the reaction force CPU ends the process, and completes the rudder angle correction process in the reaction force side. Thereafter, notice of the completion of the process in the reaction force side is given to the turning CPU through the local network 49.

On the other hand, in the case where the CPUs 51a, 51b include the CPU in the system in which the setting of the reaction force reference value θns has not been completed while the CPUs 51a, 51b includes the CPU in the system in which the setting of the reaction force reference value θns has been completed (step 206: NO), the reaction force CPU executes the state coordination process (step 208). The state coordination process is a coordination process for performing coordination such that the reaction force CPU, that is, each of the CPUs 51a, 51b can execute the control information setting process (step 204) including the learning process again. For example, the state coordination process includes a process for maintaining the CPU that is of the reaction force CPU and that is in the system in which the setting of the reaction force reference value θns has been completed, in the state of the completion of the setting, and causing the CPU to execute the learning process again together with the CPU in the other system. Alternatively, the state coordination process may include a process for erasing the reaction force reference value θns set by the CPU that is of the reaction force CPU and that is in the system in which the setting of the reaction force reference value θns has been completed. In this case, the CPU that is of the reaction force CPU and that is in the system in which the setting of the reaction force reference value θns has been completed is put into a state where the setting of the reaction force reference value θns has not been completed, and thereby, becomes capable of executing the learning process again together with the CPU in the other system. Thereafter, the reaction force CPU repeatedly executes the control information setting process, that is, step 204 and the subsequent processes. In this case also, the reaction force CPU can repeat step 204 and the subsequent processes, until the time-out condition is met (step 106: YES).

Rudder Angle Correction Process in Turning Side

Figure 5:
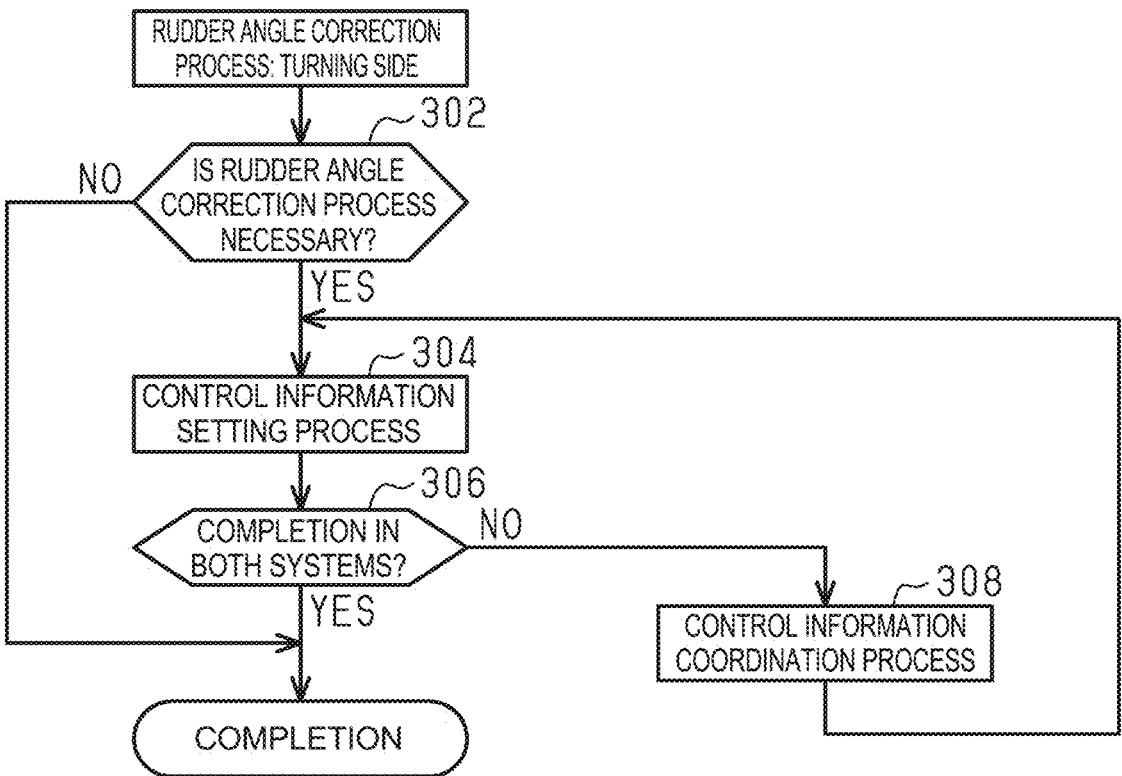
FIG. 5 is a flowchart showing a processing procedure in a turning side in the rudder angle correction process in FIG. 3.

As shown in FIG. 5, in the rudder angle correction process in the turning side, the turning CPU determines whether the rudder angle correction process needs to be executed (step 302). In step 302, the turning CPU determines that the rudder angle correction process needs to be executed, in the case where the turning CPU cannot read the turning reference value θnt in the initial check process (step 100). The turning CPU cannot read the turning reference value θnt in the initial check process, in the case where the turning reference value θnt has not been internally set. For example, in a state after the battery 47 is detached and replaced, the turning reference value θnt has not been internally set. Similarly, in a state after reading abnormality or writing abnormality about the turning reference value θnt occurs, the turning reference value θnt has not been internally set.

Subsequently, in the case where the turning CPU can read the turning reference value θnt in the initial check process (step 100) and therefore does not need to execute the rudder angle correction process (step 302: NO), the turning CPU ends the process, and completes the rudder angle correction process in the turning side. Notice of the completion of the process in the turning side is given to the reaction force CPU through the local network 49. In the case where both the completion of the process in the turning side and the receiving of notice of the completion of the rudder angle correction process in the reaction force side from the reaction force CPU are met, the turning CPU can make the determination of YES in step 102.

On the other hand, in the case where the turning CPU cannot read the turning reference value θnt in the initial check process (step 100) and therefore needs to execute the rudder angle correction process (step 302: YES), the turning CPU executes a control information setting process (step 304). In step 304, the control information setting process that is executed by the turning CPU includes a process of referring to the rotational angle θb. The turning CPU includes a process of referring to the pinion absolute rotational angle θabp. The control information setting process in the turning side includes a rotational angle correction process in which each CPU of the turning CPU corrects the rotational angle θb by referring to the pinion absolute rotational angle θabp that is correction information.

For example, as shown in FIG. 7, the rotational angle correction process includes a process of computing the number of times of rotation that corresponds to the pinion absolute rotational angle θabp. The rotational angle correction process includes a process of computing a corrected pinion angle θpc that is obtained by correcting the rotational angle θb to an absolute rotation angle that is an integrated rotation angle, based on the number of times of rotation. The rotational angle correction process includes a process of computing a value about the corrected pinion angle θpc that corresponds to the rack neutral position, as a turning mid-point value θct. The turning mid-point value θct obtained in this way is written and set as the turning reference value θnt, by the turning CPU, that is, by each of the CPUs 61a, 61b.

Subsequently, the turning CPU determines whether the setting of the turning reference value θnt has been completed in both systems (step 306). In step 306, the turning CPU determines whether the setting of the turning reference value θnt has been completed by each of the CPUs 61a, 61b. Further, the turning CPU determines whether there is a CPU in a system in which the setting of the turning reference value θnt has not been completed while there is a CPU in a system in which the setting of the turning reference value θnt has been completed. During the rotational angle correction process, the CPUs 61a, 61b give notice of the completion of the setting of the turning reference value θnt, to each other, as the result of the rotational angle correction process, by inter-microcomputer communication or the like.

The turning CPU does not execute step 306 when neither of the CPUs 61a, 61b has completed the setting of the turning reference value θnt. In the case where neither of the CPUs 61a, 61b has completed the setting of the turning reference value θnt in this way, the time-out condition is met in time (step 106: YES), so that the steering CPU transitions to the function stop state.

Subsequently, in the case where the setting of the turning reference value θnt has been completed by each of the CPUs 61a, 61b and thereby the setting of the turning reference value θnt has been completed in both systems (step 306: YES), the turning CPU ends the process, and completes the rudder angle correction process in the turning side. Thereafter, notice of the completion of the process in the turning side is given to the reaction force CPU through the local network 49.

On the other hand, in the case where the CPUs 61a, 61b include the CPU in the system in which the setting of the turning reference value θnt has not been completed while the CPUs 61a, 61b includes the CPU in the system in which the setting of the turning reference value θnt has been completed (step 306: NO), the turning CPU executes the control information coordination process (step 308). The control information coordination process is a coordination process of coordinating the CPU that is of the turning CPU and that is in the system in which the setting of the turning reference value θnt has not been completed, such that the turning reference value θnt after setting completion in the CPU in the system in which the setting has been completed can be set. For example, the control information coordination process includes a process of sending the turning reference value θnt set by the CPU that is of the turning CPU and that is in the system in which the setting of the turning reference value θnt has been completed, to the CPU in the system in which the setting of the turning reference value θnt has not been completed, by inter-microcomputer communication or the like. The control information coordination process includes a process of completing the setting of the turning reference value θnt for the CPU in the system in which the setting of the turning reference value θnt has not been completed, by setting the turning reference value θnt for the CPU using the turning reference value θnt received by inter-microcomputer communication or the like. Thereafter, since each of the CPU 61a, 61b has completed the setting of the turning reference value θnt, the turning CPU ends the process, and completes the rudder angle correction process in the turning side.

Operation of Embodiment

For example, as shown in FIG. 6, the reaction force CPU sometimes runs into a situation where the CPUs 51a, 51b include the CPU in the system in which the setting of the reaction force reference value θns has not been completed while the CPUs 51a, 51b include the CPU in the system in which the setting of the reaction force reference value θns has been completed. The part "(a)" of FIG. 6 shows the state of the main-CPU 51a of the reaction force CPU. The part "(b)" of FIG. 6 shows the state of the sub-CPU 51b of the reaction force CPU. In this example, only the sub-CPU 51b of the reaction force CPU performs reset operation in the middle of the learning process, for example, due to a temporary decrease in electric power.

The CPUs 51a, 51b both start the learning process, and thereby, rotate the steering wheel 3 in the rightward direction (step 402). Thereafter, only the sub-CPU 51*b* performs the reset operation while the main-CPU 51*a* normally continues the learning process.

As a result of the continuation of the learning process, the steering wheel 3 reaches the rightward limit position 3*a*, and thereby, the main-CPU 51*a* temporarily stores the right limit position θrl (step 404*a*). On the other hand, the sub-CPU 51*b* performs the reset operation (step 404*b*), and thereby, terminates the learning process. Even when the sub-CPU 51*b* returns from the reset operation to a state where the sub-CPU 51*b* can execute the control information setting process thereafter (step 406*b*), the sub-CPU 51*b* cannot return to the learning process because the learning process is terminated. That is, the sub-CPU 51*b* cannot complete the learning process, namely, the control information setting process, and gives notice of the non-completion to the main-CPU 51*a* by inter-microcomputer communication or the like.

The main-CPU 51*a* further continues the learning process, and as a result, rotates the steering wheel 3 in the leftward direction (step 406*a*). Furthermore, the steering wheel 3 reaches the leftward limit position 3*b*, and thereby, the main-CPU 51*a* temporarily stores the left limit position θll (step 408*a*), and computes the reaction force mid-point value θcs (step 410*a*).

Thereafter, the main-CPU 51*a* completes the setting of the reaction force reference value θns (step 412*a*). On the other hand, the sub-CPU 51*b* does not complete the setting of the reaction force reference value θns (step 412*b*). Thereby, there is the sub-CPU 51*b* that has not completed the setting of the reaction force reference value θns while there is the main-CPU 51*a* that has completed the setting of the reaction force reference value θns, and therefore, the reaction force CPU makes the determination of NO in step 206 (step 414). Thereafter, by executing the state coordination process, the reaction force CPU performs coordination such that each CPU can execute the control information setting process including the learning process again.

In this way, even in the case where there is the CPU in the system in which the setting of the reaction force reference value θns has not been completed, the reaction force CPU can complete the setting of the reaction force reference value θns in the CPUs in all systems, by the state coordination process.

Similarly, for example, as shown in FIG. 7, the turning CPU sometimes runs into a situation where the CPUs 61*a*, 61*b* include the CPU in the system in which the setting of turning reference value θnt has not been completed while the CPUs 61*a*, 61*b* include the CPU in the system in which the setting of the turning reference value θnt has been completed. The part "(a)" of FIG. 7 shows the state of the main-CPU 61*a* of the turning CPU. The part "(b)" of FIG. 7 shows the state of the sub-CPU 61*b* of the turning CPU. In this example, in the rotational angle correction process, only the sub-CPU 61*b* of the turning CPU cannot continue the rotational angle correction process, for example, due to the failure of the referring to the rotational angle θb or the pinion absolute rotational angle θabp.

Each of the CPUs 61*a*, 61*b* starts the rotational angle correction process, and thereby, refers to the pinion absolute rotational angle θabp (step 502*a*). Thereafter, as a result of the continuation of the rotational angle correction process, the main-CPU 61*a* computes the corrected pinion angle θpc that is obtained by correcting the rotational angle θb based on the number of times of rotation that corresponds to the pinion absolute rotational angle θabp (step 504*a*).

On the other hand, the sub-CPU 61*b* fails to refer to the rotational angle θb or the pinion absolute rotational angle θabp (step 502*b*), and thereby, terminates the rotational angle correction process. Thereafter, the sub-CPU 61*b* gives notice of the non-completion of the rotational angle correction process, namely, the control information setting process, to the main-CPU 61*a* through inter-microcomputer communication or the like.

The main-CPU 61*a* further continues the rotational angle correction process. As a result, the main-CPU 61*a* computes the turning mid-point value θct (step 506*a*), and completes the setting of the turning reference value θnt (step 508*a*). On the other hand, the sub-CPU 61*b* does not complete the setting of the turning reference value θnt (step 508*b*). Thereby, there is the sub-CPU 61*b* that has not completed the setting of the turning reference value θnt while there is the main-CPU 61*a* that has completed the setting of the turning reference value θnt, and therefore, the turning CPU makes the determination of NO in step 306 (step 510). Thereafter, by executing the control information coordination process, the turning CPU performs coordination such that the sub-CPU 61*b* can set the turning reference value θnt after setting completion in the main-CPU 61*a*.

In this way, even in the case where there is the CPU in the system in which the setting of the turning reference value θnt has not been completed, the turning CPU can complete the setting of the turning reference value θnt in the CPUs in all systems, by the control information coordination process.

Effect of Embodiment (1-1) Even in the case where there is the CPU in the system in which the setting of the reaction force reference value θns has not been completed, the reaction force CPU can complete the setting of the reaction force reference value θns in the CPUs in all systems, by the state coordination process. The same goes for the turning CPU. That is, the turning CPU can complete the setting of the turning reference value θnt in the CPUs in all systems, by the control information coordination process. Thereby, in the reaction force CPU and the turning CPU, it is possible to restrain the occurrence of a situation where it is not possible to determine whether the setting of the respective reference values θns, θnt has been completed in both systems and this affair is repeated endlessly. Accordingly, it is possible to restrain the prolongation of a period after the electric power source of the vehicle steering system 2 is turned on and before the control to steer the driving of the vehicle is enabled.

(1-2) By the state coordination process, the reaction force CPU can cause the CPU in the system in which the setting of the reaction force reference value θns has been completed to execute the control information setting process including the learning process, again. Thereby, it is possible to cause each of the CPU 51*a*, 51*b* in all systems to execute the control information setting process again, regardless of whether the setting of the reaction force reference value θns has been completed.

(1-3) In the reaction force CPU, even in the case where each of the CPUs 51*a*, 51*b* of the reaction force control unit 50 sets the reaction force reference value θns by rotating the steering wheel 3, the CPUs in all systems can execute the control information setting process again. That is, it is possible to restrain the occurrence of a matter in which the steering wheel 3 cannot be rotated due to the difference in the internal state between the CPUs 51*a*, 51*b*, for example.

(1-4) By the control information coordination process, the turning CPU can complete the setting of the turning reference value θnt also in the CPU in the system in which the setting of the turning reference value θnt has not been completed, using the turning reference value θnt after setting completion in the CPU in the system in which the setting of the turning reference value θnt has been completed. Thereby, when there is the CPU in the system in which the setting of the turning reference value θnt has been completed, it is possible to complete the setting of the turning reference value θnt in the CPUs in all systems.

(1-5) By the control information coordination process, the turning CPU can complete the setting of the turning reference value θnt in the CPUs 61a, 61b of the turning control unit 60. Thereby, even in the case where each of the CPUs 61a, 61b sets the turning reference value θnt by correcting the rotational angle θb using the pinion absolute rotational angle θabp, the CPUs in all systems can complete the setting of the turning reference value θnt. That is, even when the CPUs 61a, 61b include a CPU in a system that has failed to acquire the rotational angle θbor the pinion absolute rotational angle θabp, it is possible to quickly cope.

OTHER EMBODIMENTS

The above embodiment may be modified as follows. Further, the following other embodiments can be combined with each other within a range in which there is no technical inconsistency.

In the control information setting process in the reaction force side, the control information coordination process in the control information setting process in the turning side may be executed instead of the state coordination process. Alternatively, in the control information setting process in the reaction force side, the control information coordination process may be executed in the case where the execution of the state coordination process is repeated.

In the control information setting process in the turning side, the state coordination process in the control information setting process in the reaction force side may be executed instead of the control information coordination process. In this case, in the control information setting process in the turning side, the control information coordination process may be executed in the case where the execution of the state coordination process is repeated.

The control information setting process only needs to be configured such that at least the state coordination process is executed in the control information setting process in the reaction force side. That is, the control information setting process in the turning side may be configured such that the control information coordination process is not executed. In this described other embodiment, the turning control unit 60 may be constituted by a single system.

The control information setting process only needs to be configured such that at least the control information coordination process is executed in the control information setting process in the turning side. That is, the control information setting process in the reaction force side may be configured such that the state coordination process is not executed. In this described other embodiment, the reaction force control unit 50 may be constituted by a single system.

The method for internally setting the reaction force reference value θns is not limited to the method in which the learning operation is performed, and can be altered when appropriate, for example, to a method in which the setting is manually performed by a worker. The learning process may be a process of first rotating the steering wheel 3 in the leftward direction and thereafter rotating the steering wheel 3 in the rightward direction.

The learning process only needs to include a process of temporarily storing one of the respective limit positions θrl, θll. That is, the process about the learning operation may exclude a process of temporarily storing the other of the respective limit positions θrl, θll. For example, in the case where a process of temporarily storing the right limit position θrl is included, the reaction force CPU may compute a value that is obtained by subtracting a value of half of the rotation range between the rightward limit position 3a and the leftward limit position 3b from the right limit position θrl, as the reaction force mid-point value θcs.

The learning process may include a process of determining the validity of the reaction force mid-point value θcs.

In the learning process, it is only necessary to monitor at least the electric currents iu1, iv1, iw1, for determining that the steering wheel 3 reaches the limit positions 3a, 3b. Alternatively, in addition to the above embodiment, other parameters may be considered for determining that the steering wheel 3 reaches the limit positions 3a, 3b. Examples of the other parameters can include the change amounts of the electric currents iu1, iv1, iw1, the change amount of the angular velocity ωs, and the time from the start of the rotation of the steering wheel 3.

The displacement amount of the steering wheel 3 is not limited to an amount that is calculated based on the integration process of the rotational angle θa. For example, the detection value of a rudder angle sensor that directly detects the rotational angle of the steering shaft 11 may be adopted. For example, the rudder angle sensor may be provided in the steering shaft 11 between the steering wheel 3 and the torque sensor 41.

Other than the steering angle θs, in the case where the above rudder angle sensor is used, in the control information setting process in the reaction force side, instead of the learning process, by referring to the detection result of the rudder angle sensor, each CPU of the reaction force CPU may execute the rotational angle correction process of correcting the rotational angle θa. In this described other embodiment, in the control information setting process in the reaction force side, the control information coordination process in the control information setting process in the turning side may be executed instead of the state coordination process.

In the control information setting process in the turning side, instead of the rotational angle correction process, by moving the rack shaft 22, that is, the turning wheels 5 to the respective rack ends 25 in the right and left directions, each CPU of the turning CPU may execute the learning process of acquiring values. In this described other embodiment, in the control information setting process in the turning side, the state coordination process in the control information setting process in the reaction force side may be executed instead of the control information coordination process.

The number of systems of the reaction force control unit 50 may be three or more. Even in this case, the above embodiment can be applied. The same goes for the number of systems of the turning control unit 60.

The steering actuator 12 does not need to include the steering-side speed reduction mechanism 14. The reaction force motor 13 is not limited to the three-phase brushless motor. For example, a direct-current motor with a brush may be adopted. This described other embodiment can be applied to the turning motor 32 similarly.

The pinion angle θp may be obtained by converting the detection value of the movement amount of the rack shaft 22. In this case, a controlled variable and the like relevant to the pinion angle θp are converted by the detection value of the movement amount of the rack shaft 22.

An operation member that is operated by the driver for steering the vehicle is not limited to the steering wheel 3. For example, a joystick may be adopted. The turning unit 6 transmits the rotation of the turning motor 32 to the transformation mechanism 34 through the transmission mechanism 33, but without being limited to this, for example, the turning unit 6 may be configured to transmit the rotation of the turning motor 32 to the transformation mechanism 34 through a gear mechanism. Further, the turning unit 6 may be configured such that the turning motor 32 directly rotates the transformation mechanism 34. Furthermore, the turning unit 6 may be configured to include a second rack-and-pinion mechanism, and the turning unit 6 may be configured such that the second rack-and-pinion mechanism transforms the rotation of the turning motor 32 into the reciprocating motion of the rack shaft 22.

The turning unit 6 is not limited to a configuration in which the turning wheel 5 on the right side and the turning wheel 5 on the left side are interlocked. In other words, the turning wheel 5 on the right side and the turning wheel 5 on the left side may be controlled independently.

The vehicle steering system 2 has a link-less structure in which the steering unit 4 and the turning unit 6 are mechanically separated at all times, in the above embodiment, but without being limited to this, may have a structure in which the steering unit 4 and the turning unit 6 can be mechanically separated by a clutch, for example. Further, the vehicle steering system 2 is not limited to the steer-by-wire type steering device, and may include an electric power steering device in which the torque of a motor is given to the steering shaft 11 or the rack shaft 22.

What is claimed is:

1. A steering control device that is applied to a vehicle steering system for steering traveling of a vehicle, the steering control device comprising a rudder angle control unit that includes control circuits configured to control a rudder angle variable in collaboration with each other and that is configured to execute a control in which the rudder angle variable obtained about the steering is referred to, wherein:

the rudder angle control unit is configured to execute a control information setting process that includes setting control information that is a value indicating straight movement of the vehicle and that is a reference of the rudder angle variable, and a coordination process such that all of the control circuits complete the setting of the control information when the setting of the control information has been completed in a first control circuit group of the control circuits while the setting of the control information has not been completed in a second control circuit group of the control circuits;

in the control information setting process, the rudder angle control unit enables a control to steer the traveling of the vehicle, by completing setting of the control information after an electric power source of the vehicle steering system is turned on; and the control circuits are configured to steer the traveling of the vehicle on condition that the control information has been set in all of the control circuits in the execution of the control information setting process.

2. The steering control device according to claim 1, wherein:

the coordination process includes a state coordination process of coordinating a state of the first control circuit group such that each control circuit in the first control circuit group transitions to a state of being capable of executing the control information setting process again; and the first control circuit group is configured such that each control circuit in the first control circuit group executes the control information setting process again after coordination by the state coordination process.

3. The steering control device according to claim 2, wherein:

the vehicle steering system includes a dynamic power transmission path that is cut off between a steering unit and a turning unit, the steering unit being steered by a steering wheel of the vehicle, the turning unit operating so as to turn a turning wheel of the vehicle;

the rudder angle control unit includes a reaction force control unit that includes first control circuits;

the reaction force control unit is configured to control operation of the steering unit such that a steering reaction force is given to the steering wheel, by referring to a steering variable that is the rudder angle variable obtained about the steering from the steering unit;

each of the first control circuits of the reaction force control unit is configured to execute the control information setting process based on respective values that are acquired when the steering wheel is rotated to limit positions in a first direction and a second direction; and each of the first control circuits of the reaction force control unit is configured to execute the state coordination process in the control information setting process.

4. The steering control device according to claim 1, wherein:

the coordination process includes a control information coordination process of coordinating the second control circuit group such that the setting of the control information is completed by setting the control information using the control information after setting completion in the first control circuit group; and the control circuits are configured such that the setting of the control information is completed in all of the control circuits after coordination by the control information coordination process.

5. The steering control device according to claim 4, wherein:

the vehicle steering system includes a dynamic power transmission path that is cut off between a steering unit and a turning unit, the steering unit being steered by a steering wheel of the vehicle, the turning unit operating so as to turn a turning wheel of the vehicle;

the rudder angle control unit includes a turning control unit that includes second control circuits;

the turning control unit is configured to control operation of the turning unit such that a turning force is given to the turning wheel, by referring to a turning variable that is the rudder angle variable obtained about the steering from the turning unit;

each of the second control circuits of the turning control unit is configured to execute the control information setting process by correcting the turning variable using a correction variable acquired from the turning unit in addition to the turning variable; and each of the second control circuits of the turning control unit is configured to execute the control information coordination process in the control information setting process.

6. The steering control device according to claim 1, wherein:

the vehicle steering system includes a dynamic power transmission path that is cut off between a steering unit and a turning unit, the steering unit being steered by a steering wheel of the vehicle, the turning unit operating so as to turn a turning wheel of the vehicle;

the rudder angle control unit includes a reaction force control unit that includes first control circuits and a turning control unit that includes second control circuits;

the reaction force control unit is configured to control operation of the steering unit such that a steering reaction force is given to the steering wheel, by referring to a steering variable that is obtained about the steering from the steering unit;

the turning control unit is configured to control operation of the turning unit such that a turning force is given to the turning wheel, by referring to a turning variable that is obtained about the steering from the turning unit;

the coordination process includes a state coordination process of coordinating a state of the first control circuit group such that each control circuit in the first control circuit group transitions to a state of being capable of executing the control information setting process again, and a control information coordination process of coordinating the second control circuit group such that the setting of the control information is completed by setting the control information using the control information after setting completion in the first control circuit group;

each of the first control circuits of the reaction force control unit is configured to execute the state coordination process in the control information setting process;

each of the first control circuits is configured to execute the control information setting process again after the coordination by the state coordination process, when the state coordination process is executed;

each of the second control circuits of the turning control unit is configured to execute the control information coordination process in the control information setting process; and the second control circuits are configured such that the setting of the control information is completed in all of the control circuits after the coordination by the control information coordination process, when the control information coordination process is executed.

7. A steering control method of a vehicle steering system for steering traveling of a vehicle, the steering control method comprising turning on an electric power source of the vehicle steering system;

executing a rudder angle control process in which a rudder angle variable obtained about the steering is referred to and includes a process executed by control circuits configured to control the rudder angle variable in collaboration with each other, wherein:

the rudder angle control process includes setting control information that is a value indicating straight movement of the vehicle and that is a reference of the rudder angle variable, and performing coordination such that all of the control circuits complete the setting of the control information in response to the setting of the control information being completed in a first control circuit group of the control circuits while the setting of the control information has not been completed in a second control circuit group of the control circuits;

the setting the control information enables a control to steer the traveling of the vehicle, by completing setting of the control information after an electric power source of the vehicle steering system is turned on; and the process that is executed by the control circuits controls steering the traveling of the vehicle using the control information that has been set in all of the control circuits.

* * * * *